United States Patent

Lutz

(10) Patent No.: US 8,990,282 B2
(45) Date of Patent: Mar. 24, 2015

(54) APPARATUS AND METHOD FOR PERFORMING FUSED MULTIPLY ADD FLOATING POINT OPERATION

(75) Inventor: David Raymond Lutz, Austin, TX (US)

(73) Assignee: ARM Limited, Cambridge (GB)

( * ) Notice: Subject to any disclaimer, the term of this patent is extended or adjusted under 35 U.S.C. 154(b) by 1264 days.

(21) Appl. No.: 12/585,668

(22) Filed: Sep. 21, 2009

(65) Prior Publication Data

US 2011/0072066 A1  Mar. 24, 2011

(51) Int. Cl.
- G06F 7/485 (2006.01)
- G06F 7/487 (2006.01)
- G06F 7/483 (2006.01)
- G06F 7/544 (2006.01)

(52) U.S. Cl.
CPC .............. *G06F 7/483* (2013.01); *G06F 7/5443* (2013.01)
USPC .......................................... 708/501; 708/523

(58) Field of Classification Search
CPC combination set(s) only.
See application file for complete search history.

(56) References Cited

U.S. PATENT DOCUMENTS

| | | | |
|---|---|---|---|
| 4,969,118 A | 11/1990 | Montoye et al. | |
| 5,010,508 A | 4/1991 | Sit et al. | |
| 5,631,859 A * | 5/1997 | Markstein et al. | 708/513 |
| 5,996,066 A | 11/1999 | Yung | |
| 6,085,208 A | 7/2000 | Oberman et al. | |
| 6,223,198 B1 | 4/2001 | Oberman et al. | |
| 6,594,679 B1 | 7/2003 | Lee et al. | |
| 7,225,323 B2 | 5/2007 | Siu et al. | |
| 7,296,048 B2 | 11/2007 | Ohmi et al. | |
| 7,437,400 B2 | 10/2008 | Lutz et al. | |
| 7,668,892 B2 | 2/2010 | Lutz et al. | |
| 8,078,660 B2 | 12/2011 | Quinnell et al. | |
| 8,239,440 B2 | 8/2012 | Brooks et al. | |
| 2002/0107900 A1 * | 8/2002 | Enenkel et al. | 708/501 |
| 2004/0122886 A1 | 6/2004 | Gerwig et al. | |
| 2005/0144214 A1 | 6/2005 | Datta et al. | |
| 2006/0117080 A1 | 6/2006 | Lutz et al. | |
| 2006/0136543 A1 | 6/2006 | Lutz et al. | |
| 2006/0149803 A1 * | 7/2006 | Siu et al. | 708/501 |
| 2008/0256161 A1 * | 10/2008 | Quinnell et al. | 708/501 |
| 2009/0150654 A1 | 6/2009 | Oberman et al. | |
| 2009/0248779 A1 | 10/2009 | Brooks et al. | |
| 2010/0312812 A1 | 12/2010 | Wang | |
| 2013/0282784 A1 * | 10/2013 | Oliver et al. | 708/501 |

OTHER PUBLICATIONS

U.S. Appl. No. 12/588,962, Lutz, filed Nov. 3, 2009.
U.S. Appl. No. 12/929,827, Lutz, filed Feb. 17, 2011.
UK Search Report dated May 10, 2012 in GB1200822.3.
Schwarz et al., "Hardware Implementations of Denormalized Numbers", 9 pages.

(Continued)

*Primary Examiner* — Ilwoo Park
(74) *Attorney, Agent, or Firm* — Nixon & Vanderhye P.C.

(57) ABSTRACT

A fused multiply add floating point unit 1 includes multiplying circuitry 4 and adding circuitry 8. The multiply circuitry 4 multiplies operands B and C having N-bit significands to generate an unrounded product B*C. The unrounded product B*C has an M-bit significand, where M>N. The adding circuitry 8 receives an operand A that is input at a later processing cycle than a processing cycle at which the multiplying circuitry 4 receives operands B and C. The adding circuitry 8 commences processing of the operand A after the unrounded product B*C is generated by the multiplying circuitry 4. The adding circuitry 8 adds the operand A to the unrounded product B*C and outputs a rounded result A+B*C.

15 Claims, 9 Drawing Sheets

(56) References Cited

OTHER PUBLICATIONS

Naini et al., 1-GHz HAL SPARC64 Dual Floating Point Unit with RAS Features, Proceedings of the 15$^{th}$ IEEE Symposium on Computer Arithmetic (ARITH'01), 2001, 11 pages.

Farmwald, "On the Design of High Performance Digital Arithmetic Units", *Lawrence Livermore National Laboratory (Circulation Copy)*, Aug. 1981, 106 pages.

Hinds et al., "A Small and Fast Leading One Predictor Corrector Circuit", *Arm Ltd.*, 5 pages.

Schmookler et al., "Leading Zero Anticipation and Detection—A Comparison of Methods", *IEEE*, 2001, pp. 7-12.

Huang et al., "A New Architecture for Multiple-Precision Floating-Point Multiply-Add Fused Unit Design", *IEEE Symposium on Computer Arithmetic—Computer Society*, 2007, (8 pages).

Notice of Allowance mailed Feb. 8, 2013 in co-pending U.S. Appl. No. 12/588,962.

Office Action mailed Dec. 20, 2013 in U.S. Appl. No. 12/929,827.

Office Action mailed Jun. 20, 2014 in co-pending U.S. Appl. No. 12/929,827, pp. 1-15.

\* cited by examiner $$A.B = ax + by + cz + dw$$

| t | instructions | f1 | f2 | f3 | f4 | f5 | f6 | f7 |
|---|---|---|---|---|---|---|---|---|
| 1 | 1 FMUL D0,D1,D2 | 1 | | | | | | |
| 2 | | | 1 | | | | | |
| 3 | | | | 1 | | | | |
| 4 | | | | | 1 | | | |
| 5 | | | | | | 1 | | |
| 6 | | | | | | | 1 | |
| 7 | | | | | | | | 1 |
| 8 | 2 FMLA D0,D3,D4 | 2 | | | | | | |
| 9 | | | 2 | | | | | |
| 10 | | | | 2 | | | | |
| 11 | | | | | 2 | | | |
| 12 | | | | | | 2 | | |
| 13 | | | | | | | 2 | |
| 14 | | | | | | | | 2 |
| 15 | 3 FMLA D0,D5,D6 | 3 | | | | | | |
| 16 | | | 3 | | | | | |
| 17 | | | | 3 | | | | |
| 18 | | | | | 3 | | | |
| 19 | | | | | | 3 | | |
| 20 | | | | | | | 3 | |
| 21 | | | | | | | | 3 |
| 22 | 4 FMLA D0,D7,D8 | 4 | | | | | | |
| 23 | | | 4 | | | | | |
| 24 | | | | 4 | | | | |
| 25 | | | | | 4 | | | |
| 26 | | | | | | 4 | | |
| 27 | | | | | | | 4 | |
| 28 | | | | | | | | 4 |

| t | instructions | m1 | m2 | m3 | m4 | a1 | a2 | a3 | a4 |
|---|---|---|---|---|---|---|---|---|---|
| 1 | 1 VMUL D0,D1,D2 | 1 | | | | | | | |
| 2 | 2 VMLA D0,D3,D4 | 2 | 1 | | | | | | |
| 3 | | | 2 | 1 | | | | | |
| 4 | | | | 2 | 1 | | | | |
| 5 | | | | | 2 | | | | |
| 6 | 3 VMLA D0,D5,D6 | 3 | | | | 2 | | | |
| 7 | | | 3 | | | | 2 | | |
| 8 | | | | 3 | | | | 2 | |
| 9 | | | | | 3 | | | | 2 |
| 10 | 4 VMLA D0,D7,D8 | 4 | | | | 3 | | | |
| 11 | | | 4 | | | | 3 | | |
| 12 | | | | 4 | | | | 3 | |
| 13 | | | | | 4 | | | | 3 |
| 14 | | | | | | 4 | | | |
| 15 | | | | | | | 4 | | |
| 16 | | | | | | | | 4 | |
| 17 | | | | | | | | | 4 |

| t | instructions | m1 | m2 | m3 | m4 | a1 | a2 | a3 | a4 |
|---|---|---|---|---|---|---|---|---|---|
| 1 | 1.1 VMUL D0,D1,D2 | 1.1 | | | | | | | |
| 2 | 1.2 VMLA D0,D3,D4 | 1.2 | 1.1 | | | | | | |
| 3 | 2.1 VMUL D9,D10,D11 | 2.1 | 1.2 | 1.1 | | | | | |
| 4 | 2.2 VMLA D9,D12,D13 | 2.2 | 2.1 | 1.2 | 1.1 | | | | |
| 5 | 3.1 VMUL D18,D19,D20 | 3.1 | 2.2 | 2.1 | 1.2 | | | | |
| 6 | 3.2 VMLA D18,D21,D22 | 3.2 | 3.1 | 2.2 | 2.1 | 1.2 | | | |
| 7 | 4.1 VMUL D27,D28,D29 | 4.1 | 3.2 | 3.1 | 2.2 | | 1.2 | | |
| 8 | 4.2 VMLA D27,D30,D31 | 4.2 | 4.1 | 3.2 | 3.1 | 2.2 | | 1.2 | |
| 9 | 1.3 VMLA D0,D5,D6 | 1.3 | 4.2 | 4.1 | 3.2 | | 2.2 | | 1.2 |
| 10 | 2.3 VMLA D9,D14,D15 | 2.3 | 1.3 | 4.2 | 4.1 | 3.2 | | 2.2 | |
| 11 | 3.3 VMLA D18,D23,D24 | 3.3 | 2.3 | 1.3 | 4.2 | | 3.2 | | 2.2 |
| 12 | 4.3 VMLA D27,D1,D2 | 4.3 | 3.3 | 2.3 | 1.3 | 4.2 | | 3.2 | |
| 13 | 1.4 VMLA D0,D7,D8 | 1.4 | 4.3 | 3.3 | 2.3 | 1.3 | 4.2 | | 3.2 |
| 14 | 2.4 VMLA D9,D16,D17 | 2.4 | 1.4 | 4.3 | 3.3 | 2.3 | 1.3 | 4.2 | |
| 15 | 3.4 VMLA D18,D25,D26 | 3.4 | 2.4 | 1.4 | 4.3 | 3.3 | 2.3 | 1.3 | 4.2 |
| 16 | 4.4 VMLA D27,D3,D4 | 4.4 | 3.4 | 2.4 | 1.4 | 4.3 | 3.3 | 2.3 | 1.3 |
| 17 | | | 4.4 | 3.4 | 2.4 | 1.4 | 4.3 | 3.3 | 2.3 |
| 18 | | | | 4.4 | 3.4 | 2.4 | 1.4 | 4.3 | 3.3 |
| 19 | | | | | 4.4 | 3.4 | 2.4 | 1.4 | 4.3 |
| 20 | | | | | | 4.4 | 3.4 | 2.4 | 1.4 |
| 21 | | | | | | | 4.4 | 3.4 | 2.4 |
| 22 | | | | | | | | 4.4 | 3.4 |
| 23 | | | | | | | | | 4.4 |

FIG. 6

APPARATUS AND METHOD FOR PERFORMING FUSED MULTIPLY ADD FLOATING POINT OPERATION

BACKGROUND OF THE INVENTION

1. Field of the Invention

The present invention relates to the field of data processing. In particular, the invention relates to an apparatus for performing a fused multiply add floating point operation.

2. Description of the Prior Art

Processors for performing arithmetic operations on floating point numbers are known. In floating point representation, numbers are represented using a significand 1.F, an exponent E and a sign bit S. The sign bit S represents whether the floating point number is positive or negative, the significand 1.F represents the significant digits of the floating point number, and the exponent E represents the position of the radix point (also known as a binary point) relative to the significand. By varying the value of the exponent, the radix point can "float" left and right within the significand. This means that for a predetermined number of bits, a floating point representation can represent a wider range of numbers than a fixed point representation (in which the radix point has a fixed location within the significand). However, the extra range is achieved at the expense of reduced precision since some of the bits are used to store the exponent. Sometimes, a floating point arithmetic operation generates a result with more significant bits than the number of bits used for the significand. If this happens then the result is rounded to a value that can be represented using the available number of significant bits.

FIG. 1 of the accompanying drawings shows how floating point numbers are stored within a register or memory. In a single precision representation, 32 bits are used to store the floating point number. One bit is used as the sign bit S, eight bits are used to store the exponent E, and 23 bits are used to store the fractional portion F of the significand 1.F. The 23 bits of the fractional portion F, together with an implied bit having a value of one, make up a 24-bit significand 1.F. The radix point is initially assumed to be placed between the implied bit and the 23 stored bits of the significand. The stored exponent E is biased by a fixed value 127 such that in the represented floating point number the radix point is shifted left from its initial position by E-127 places if E-127 is negative (e.g. if E-127=−2 then a significand of 1.01 represents 0.0101), or right from its initial position by E-127 places if E-127 is positive (e.g. if E-127=2 then a significand of 1.01 represents 101). The bias is used to make it simpler to compare exponents of two floating point values as then both negative and positive shifts of the radix point can be represented by a positive value of the stored exponent E. As shown in FIG. 1, the stored representation S[31], E[30:23], F[22:0] represents a number with the value $(-1)^S * 1.F[22:0] * 2^{(E-127)}$. A single-precision floating point number in this form is considered to be "normal". If a calculated floating point value is not normal (for example, it has been generated with the radix point at a position other than between the left-most two bits of the significand), then it is normalized by shifting the significand left or right and adjusting the exponent accordingly until the number is of the form $(-1)^S * 1.F[22:0] * 2^{E-127}$. Exception handling routines are provided to handle numbers that cannot be represented as a normal floating point value.

A double precision format is also provided in which the significand and exponent are represented using 64 stored bits. The 64 stored bits include one sign bit, an 11-bit exponent and the 52-bit fractional portion F of a 53-bit significand 1.F. In double precision format the exponent E is biased by a value of 1023. Thus, in the double precision format a stored representation S[63], E[62:52], F[51:0] represents a floating point value $(-1)^S * 1.F[51:0] * 2^{E-1023}$.

Hereafter the present invention shall be explained with reference to the double precision floating point format. However, it will be appreciated that the invention could also be applied to the single precision format (or any other floating point format) and that the bit values shown in subsequent Figures could be replaced by values appropriate to the floating point format being used.

One commonly used floating point operation is a multiply add operation A+B*C, whereby two operands are multiplied together and the product of those two operands is added to a third operand. The multiply add operation is also known as a multiply accumulate operation. It is possible to implement a multiply add operation using independent multiply and add units operating in succession. This approach, known as a split chained multiply add, performs floating point rounding on two occasions (once during the multiply operation and once during the add operation). Each rounding step results in a loss of precision and so the split chained multiply add can produce inaccurate results (especially when calculating quantities such as reciprocals which may be irrational). The split chained multiply add operation is also relatively slow, and so most floating point units instead provide a specialized fused multiply add unit that performs the multiply add operation as an atomic operation.

FIG. 2 of the accompanying drawings shows an example of a fused multiply add unit, such as the one proposed by Montoye et al in U.S. Pat. No. 4,969,118. The fused multiply add unit receives three operands A, B, and C and processes the operands to output the multiply accumulate result A+B*C. Addition of the operand A and the product B*C requires alignment of the significands of the operand A and the product B*C such that their exponents are the same. To align the significands, the fused multiply add unit carries out shifting of the operand A in parallel with computation of the product B*C. Since some of the add processing is performed at the same time as the multiply processing, the fused multiply add unit can perform a multiply add operation quicker than a split chained multiply add unit. The fused multiply add unit is also more accurate than the split chained multiply add because it performs rounding only on the final result and not on the intermediate product B*C. The present invention seeks to make further improvements to the fused multiply add unit.

SUMMARY OF THE INVENTION

Viewed from one aspect the present invention provides a data processing apparatus for performing a fused multiply add operation on operands A, B and C to generate a result A+B*C, said operands A, B and C and said result A+B*C being floating point values each having an N-bit significand, said data processing apparatus comprising:

multiplying circuitry configured to multiply said operand B and said operand C to generate an unrounded product B*C having an M-bit significand, where M>N;

adding circuitry configured to add said unrounded product B*C to said operand A and output a rounded result A+B*C having an N-bit significand; and control circuitry responsive to a fused multiply add instruction to control said multiplying circuitry and said adding circuitry to perform said fused multiply add operation in a plurality of processing cycles; wherein said adding circuitry comprises a first input for receiving said operand A at a later processing cycle than a processing cycle at which said operands B and C are input to said multiplying circuitry; and said adding circuitry is controlled by said control circuitry to commence processing of said operand A after said multiplying circuitry has generated said unrounded product B*C.

The present technique recognizes that the processing throughput of a fused multiply add unit depends not only on the speed at which it processes a single fused multiply add instruction but also on the number of cycles required to process several instructions. Counter intuitively, optimizing the fused multiply add unit to execute a single instruction as quickly as possible does not achieve the greatest throughput of instructions. In the present technique, the fused multiply add unit is provided with multiplying circuitry and adding circuitry. The multiplying and adding stages are controlled in response to a fused multiply add instruction to perform the fused multiply add operation during a plurality of processing cycles. The operand A is input to the adding circuitry at a later processing cycle than a processing cycle at which the operands B and C are input to the multiplying circuitry, and the adding circuitry commences processing of the operand A after the multiplying circuit has generated an unrounded product B*C. Since the operand A is required only at the adding stage and is not required for processing the multiply stage, processing of the fused multiply add instruction can be interleaved with processing of other instructions such that the processing throughput of the apparatus is increased. Thus, despite the fused multiply add unit of the present technique taking more processing cycles to process the fused multiply add instruction than the fused multiply add unit shown in FIG. 2, the overall performance of the data processing apparatus is improved. Also, since the multiplying circuitry generates an unrounded product which is added to the operand A by the adding circuitry, there is no intermediate rounding step and so the final rounded result A+B*C is more accurate than a result produced by a split chained multiply add unit.

The fused multiply add instruction may be one of a sequence of instructions being executed by the apparatus, and the operand A may be a value generated in response to a preceding instruction in the sequence of instructions. In this case, processing throughput is greatly improved because the fused multiply add unit can begin processing the fused multiply add instruction before the preceding instruction has finished generating the operand A. The operand A is not required by the fused multiply add instruction until the adding stage.

The control circuitry of the fused multiply add unit may be responsive to a sequence of fused multiply add instructions comprising a first fused multiply add instruction and a second fused multiply add instruction to control the multiplying circuitry and adding circuitry such that the adding circuitry performs an add operation in response to the first fused multiply add instruction in parallel with the multiply circuitry performing a multiply operation in response to the second fused multiply add instruction. Whereas known fused multiply add units would wait until the first fused multiply add instruction has finished processing before starting processing of the second fused multiply add instruction, the fused multiply add unit of the present technique is able to begin processing the second fused multiply add instruction once the first fused multiply add instruction has started the adding stage. Therefore, fewer processing cycles are required to process the sequence of fused multiply add instructions. This is useful because programmers of floating point units often use a sequence of fused multiply add instructions to calculate a vector dot product A·B or cross product A×B, each of which consists of a sum of various products. The floating point unit of the present technique is well suited to calculating such dot or cross products.

In a further feature, the adding circuitry may comprise a second input for receiving an operand D having an N-bit significand, and the control circuitry may be responsive to an add instruction to control the adding circuitry to add the operand A to the operand D and output a rounded result A+D having an N-bit significand.

The present technique provides the adding circuitry with a second input for receiving a second adding operand D. An add instruction (separate from the fused multiply add instruction) can be executed by the fused multiply add unit. When an add instruction is used then the multiply stage of the fused multiply add unit is bypassed and the adding circuitry is used independently to add the operands A and D together, round the sum of operands A and D to a value representable with the available number of bits of significand and exponent, and output a rounded result A+D. The multiply stage is not used to execute the add instruction. This is in contrast to the fused multiply add unit of FIG. 2 in which the adding stage cannot be used independently from the multiply stage and in which an add instruction is executed by setting one of the multipliers B and C to a value of one such that the fused multiply add unit calculates the value A+B*1. The present technique avoids the waste of processing time and power arising from performing an unnecessary multiplication in order to execute an add instruction.

The control circuitry may be configured to control the adding circuitry and the multiplying circuitry such that the adding circuitry performs an add operation in response to the add instruction in parallel with the multiplying circuitry performing a multiply operation in response to the fused multiply add instruction. Thus, the add instruction can be processed by the add stage of the fused multiply add unit at the same time as the multiply stage of a fused multiply add instruction is being processed by the multiplying circuitry. This enables the processing throughput of the floating point unit to be improved.

In a further feature, the multiplying circuitry may comprise rounding circuitry configured to round the unrounded product B*C having an M-bit significand and output a rounded product B*C having an N-bit significand, and the control circuitry may be responsive to a multiply instruction to control the multiplying circuitry to multiply the operands B and C to generate the unrounded product B*C and to control the rounding circuitry to output the rounded product B*C.

The multiplying circuitry may operate independently from the adding circuitry so as to execute a multiply instruction for multiplying operands B and C. However, the unrounded product B*C has an M-bit significand which is too large to be used as an output result. Therefore, the multiplying circuitry includes rounding circuitry which reduces the number of bits in the significand to N bits and rounds the unrounded product B*C to a rounded product B*C having a value representable with the N-bit significand. The rounding circuitry is used when the multiply circuitry executes a multiply instruction and is not used when a fused multiply add instruction is executed. By providing the multiplying circuitry with rounding circuitry, the fused multiply add unit of the present technique can be used to execute multiply instructions so as to output a rounded product result without needing to use the add circuitry. This is in contrast to the known fused multiply add unit of FIG. 2 in which a multiply instruction would be executed by setting the value of operand A to zero and thus calculating the result of 0+B*C. The present technique avoids the waste of processing time and power involved in performing this unnecessary addition.

In a further feature, the control circuitry may be configured to control the adding circuitry and the multiplying circuitry such that the adding circuitry performs an add operation in response to the fused multiply add instruction in parallel with the multiplying circuitry performing a multiply operation in response to the multiply instruction. Thus, processing of a fused multiply add instruction can be interleaved with processing of a multiply instruction so as to reduce the combined time required to process both instructions.

In order to support the multiply instruction as well as the fused multiply add instruction, the multiply circuitry may be provided with a first output for transferring the unrounded product B*C to the adding circuitry in response to the fused multiply add instruction, and a second output for outputting the rounded product B*C as a processing result of the multiplying instruction. Whereas the rounded product B*C is accessible to the user of the fused multiply add unit, the unrounded product B*C forwarded to the adding stage is not accessible to the programmer, and is used internally by the floating point unit.

In a further feature, the apparatus may comprise unrounded product forwarding circuitry having an M-bit data path for transferring the unrounded product B*C from the multiplying circuitry to the adding circuitry. The provision of the M-bit data path means that no rounding operation is necessary between the multiply and add stages of the fused multiply add unit. A rounding operation involves reducing the precision of the significand and rounding the value to a floating point value representable using the smaller significand. By avoiding the need for rounding between the multiply and add stages, the accuracy of the final result A+B*C is improved.

The operands A, B and C and the rounded result A+B*C each have an X-bit exponent, X being an integer. The unrounded product B*C has an X+1-bit exponent. This is because multiplication of operands B and C requires addition of the exponents of operands B and C and the addition of two X-bit exponents could overflow and hence require an extra bit. To avoid needing to round the floating point value of the unrounded product B*C, the apparatus is provided with exponent forwarding circuitry having an X+1-bit data path for transferring the X+1-bit exponent of the unrounded product B*C from the multiplying circuitry to the adding circuitry. By avoiding the extra rounding operation, the accuracy of the final result will be improved.

The fused multiply add unit of the present technique may be arranged to process single precision floating point values. In this case, N=24, M=48, and X=8. The floating point unit could also be implemented to process double precision floating point values, in which case N=53, M=106 and X=11. The N-bits of the significand include N-1 bits stored in a register or memory location and one implied bit that is not stored in the register or memory location but is appended to the stored bits of the significand before inputting the operand to the fused multiply add unit. Similarly, the M bits of the unrounded products B*C include bits arising from partial products of the significands of the operands B and C, including implied bits.

Viewed from a further aspect the present invention provides a data processing apparatus for performing a fused multiply add operation on operands A, B and C to generate a result A+B*C, said operands A, B and C and said result A+B*C being floating point values each having an N-bit significand, said data processing apparatus comprising:

multiplying means for multiplying said operand B and said operand C to generate an unrounded product B*C having an M-bit significand, where M>N;

adding means for adding said unrounded product B*C to said operand A and output a rounded result A+B*C having an N-bit significand; and controlling means for controlling, in response to a fused multiply add instruction, said multiplying means and said adding means to perform said fused multiply add operation in a plurality of processing cycles; wherein said adding means comprises first input means for receiving said operand A at a later processing cycle than a processing cycle at which said operands B and C are input to said multiplying means; and said adding means is controlled by said controlling means to commence processing of said operand A after said multiplying means has generated said unrounded product B*C.

Viewed from another aspect, the present invention provides a method for performing a fused multiply add operation on operands A, B and C to generate a result A+B*C, said operands A, B and C and said result A+B*C being floating point values each having an N-bit significand, said method comprising the steps of:

multiplying said operand B and said operand C to generate an unrounded product B*C having an M-bit significand, where M>N; and adding said unrounded product B*C to said operand A; and outputting a rounded result A+B*C having an N-bit significand; wherein:

said fused multiply add operation is performed in a plurality of processing cycles;

said adding step receives said operand A at a later processing cycle than a processing cycle at which said operands B and C are input to said multiplying step; and said adding step commences processing of said operand A after said multiplying step has generated said unrounded product B*C.

The above, and other objects, features and advantages of this invention will be apparent from the following detailed description of illustrative embodiments which is to be read in connection with the accompanying drawings.

BRIEF DESCRIPTION OF THE DRAWINGS

FIG. 4 illustrates an example calculation of a dot product by the known fused multiply add unit;

FIG. 5 illustrates an example calculation of the dot product using the fused multiply add unit having separate multiply and add stages;

FIG. 6 illustrates the interleaving of processing of instructions for calculating four dot products using the fused multiply add unit having separate multiply and add stages;

DESCRIPTION OF THE PREFERRED EMBODIMENTS

Figure 3:
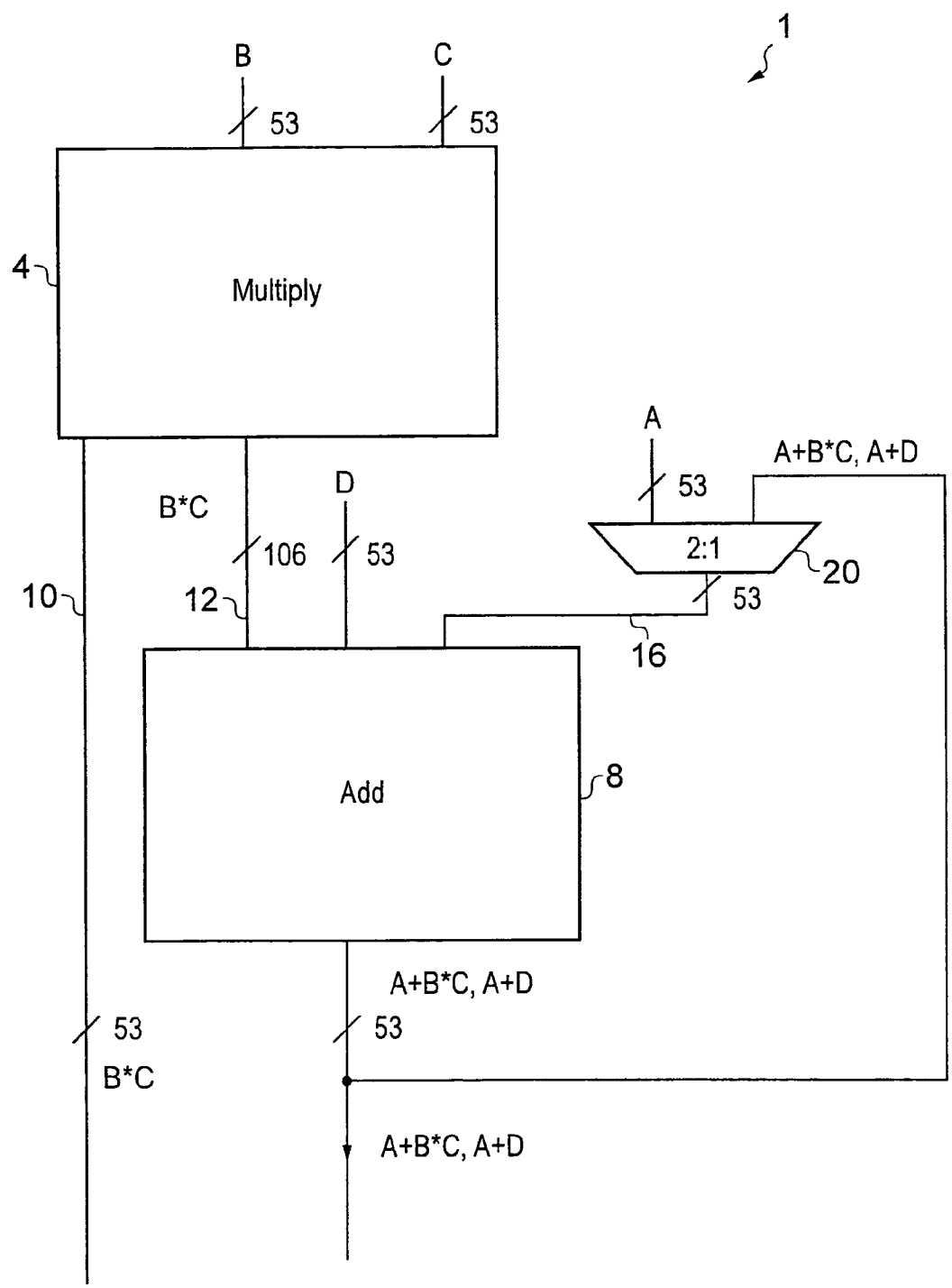
FIG. 3 illustrates a fused multiply add unit including separate multiply and add stages.

FIG. 3 schematically illustrates a fused multiply add processing unit 1 that may be used as part of a floating point processing unit. Various elements of the fused multiply add unit shall be described below, although it will be appreciated that the floating point multiply add unit 1 would also include additional features and elements not illustrated in FIG. 3 for clarity. The fused multiply add unit 1 is illustrated as processing double precision operands having 53-bit significands, although the fused multiply add unit 1 could also process single precision operands with 24-bit significands (or floating point numbers represented using another floating point format having an N-bit significands).

The fused multiply add unit 1 includes multiplying circuitry 4 and adding circuitry 8. The multiplying circuitry 4 receives two operands B and C having 53-bit significands. The multiplying circuitry is responsive to a multiply instruction to multiply the operands B and C and to output on line 10 a normal, rounded, product B*C having a 53-bit significand. The multiply circuitry 4 is also responsive to a fused multiply add instruction to multiply the operands B and C to generate an unrounded product B*C having a 106-bit significand. The unrounded product B*C is transferred over bus 12 to the adding circuitry 8.

The adding circuitry 8 receives an operand A over bus 16. The operand A has a 53-bit significand. The adding circuitry also receives one or both of an operand D having a 53-bit significand and the unrounded product B*C having 106-bit significand. The adding circuitry 8 is responsive to a fused multiply add instruction to add the operand A received over bus 16 to the unrounded product B*C received over bus 12. The adding circuitry is also responsive to an add instruction to add the operand A to the operand D. Regardless of which of the instructions is being executed, a rounded result value A+B*C or A+D is then output by the adding circuitry 8. The output of the adding circuitry 8 can either be sent to a register file (not illustrated) for storage or can be forwarded back to a multiplexer 20 where the output value can be selected for use as the operand A for a subsequent instruction.

The addition stage 8 of the fused multiply add unit 1 requires at least one of the significands being added to be shifted so that the exponents of the quantities being added are the same (note that while buses for transferring the exponent and sign bits of the various operands have not been illustrated in FIG. 3 for clarity, these would also be present). The adding circuitry 8 does not begin alignment processing of operand A until after the unrounded product B*C has been generated by the multiplying circuitry 4. This means that the input operand A is not required until after the multiplying stage has completed. The multiply circuitry 4 can begin processing a multiply fused add instruction before the operand A has been generated by a preceding instruction. Thus, the processing throughput of the fused multiply add unit is increased.

Both the multiplying circuitry 4 and the adding circuitry 8 include circuitry for rounding floating point values (although the rounding circuitry of the multiply circuitry 4 is not used when the multiplying circuitry 4 is being used to execute a fused multiply add instruction). Rounding of floating point values is performed by reducing the number of bits of the significand, and adding a rounding value to the shortened significand so as to produce a value representable using the shorter significand. A method for performing rounding during the multiply stage 4 is described in US Patent Application 2006/0117080 A1, the contents of which are incorporated in their entirety herein by reference. A method for performing rounding during the adding stage 8 is described in US Patent Application 2006/0136543 A1, the contents of which are incorporated in their entirety herein by reference. These applications describe techniques for speeding up rounding of floating point values by incorporating the rounding into the multiply or add operations. Thus, the rounding circuitry described in the present application is not necessarily distinct from the parts of the multiply circuitry 4 or adding circuitry 8 that perform the multiply or add operations and could comprise at least some of the same circuitry, which may be selectively configured to perform rounding or not perform rounding.

As described above, the fused multiply add unit 1 executes a fused multiply add instruction in separate multiply and add stages. While this means that more processing cycles are required to execute a single fused multiply add instruction, the processing of a sequence of fused multiply add instructions, add instructions or multiply instructions is quicker as the processing of different instructions can be interleaved. The processing of a single multiply or add instruction is also quicker than in the unit of FIG. 2 as these can be executed using only one of the multiply or add stages, not both. Simulation results have shown that the fused multiply add unit 1 can speed up processing of sequences of instructions by between 3% and 23% depending on the application being processed. The fused multiply add unit 1 is particularly efficient at calculating dot products of the form ax+by +cz+dw, since this requires a sequence of fused multiply add instructions.

Figure 1:
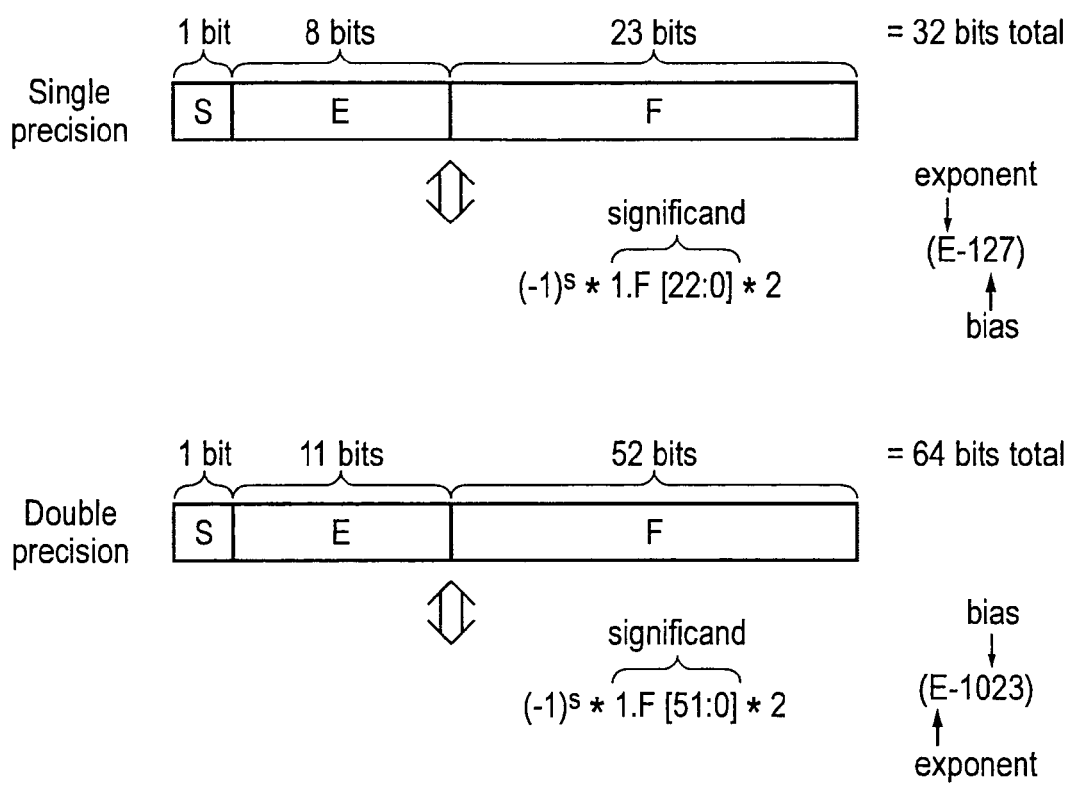
FIG. 1 illustrates floating point representation of numerical values using single and double precision formats.
Figure 2:
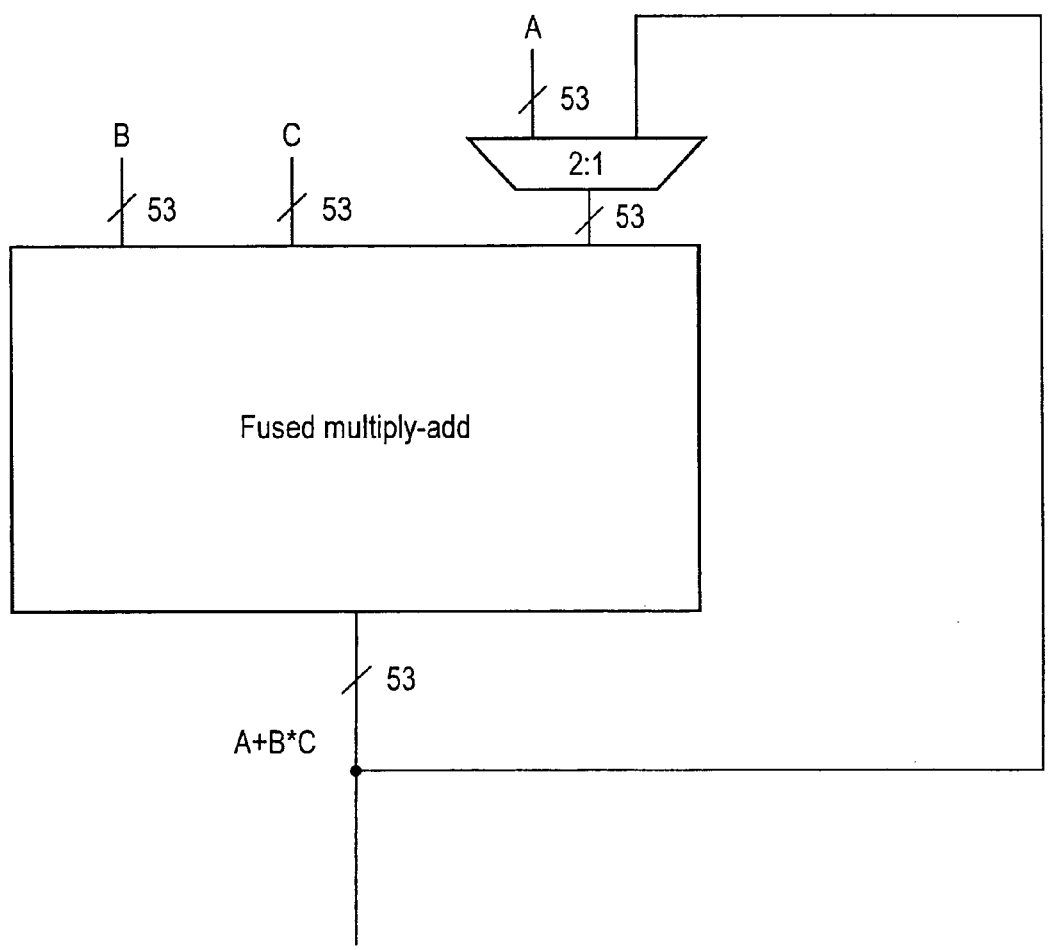
FIG. 2 illustrates a known fused multiply add unit.

FIG. 4 shows an example of how a fused multiply add unit such as the one illustrated in FIG. 2 would calculate a dot product A.B=ax+by +cz+dw. The FMUL instruction represents a fused multiply done on a fused multiply add unit of the type shown in FIG. 2. The FMLA instructions represent fused multiply add instructions done on a fused multiply add unit of the type shown in FIG. 2. The dot product requires one multiply instruction and three multiply add instructions to be executed. Each instruction accumulates to register D0 and uses operands stored in two of the registers D1-D8. Since the multiply and add parts of the fused multiply add unit of FIG. 2 are not independent, the multiply instruction requires just as many processing cycles as the multiply add instruction (in this example, seven processing cycles). Each instruction is executed using seven pipeline stages f1-f7, each taking a single cycle. Each instruction requires all of its operands to be present at the first of the seven processing stages. Since each instruction uses the result of the preceding instruction (the value stored in register D0) as the addend operand A, each instruction must wait for the preceding instruction to finish executing before it can start to be executed. Therefore, the total number of processing cycles required to calculate the dot product is 4*7=28 processing cycles.

FIG. 5 illustrates an example of how the same dot product can be calculated by the fused multiply add unit 1 of FIG. 3. In FIG. 5 and FIG. 6 discussed below the VMUL instruction represents a multiply don on the multiply part of FIG. 3 and VMLA represents a fused multiply add done on the type of unit of FIG. 3. The independent multiply circuitry 4 and adding circuitry 8 each calculate their result in four processing cycles. The multiplying circuitry 4 includes four pipeline stages m1-m4, each taking a single cycle to execute. The adding circuitry 8 includes four pipeline stages a1-a4, each taking a single cycle to execute. The number of processing cycles required to execute a fused multiply add instruction is therefore eight cycles, greater than for the fused multiply add unit of FIG. 2. However, because the fused multiply add instruction does not require its addend operand A to be input until the a1 stage, the multiply accumulate instruction can begin being processed before the preceding instruction has generated its result and so the entire sequence of instructions for calculating the dot product can be processed in 17 cycles, fewer than in FIG. 4. The latency of dependent multiply add instructions is dependent only on the number of cycles required to perform the add (as the multiply stage is overlapped with processing of the add stage of the preceding instruction). Also, the multiply instruction VMUL is executed in fewer cycles than the multiply instruction FMUL in FIG. 4. This is because in the fused multiply add unit 1 the adding circuitry is not used when executing the multiply instruction.

FIG. 6 shows an example of how the fused multiply add unit 1 can calculate four dot products. This requires four multiply instructions and twelve multiply add instructions to be executed, which would take 16*7=112 cycles to execute using the fused multiply add unit of FIG. 2. However, using the fused multiply add unit 1 of FIG. 3, the execution of these instructions can be interleaved with one another so that the four dot products are calculated in 23 processing cycles. This is a great reduction in processing time, and results in a reduction in the amount of power consumed in calculating the dot products.

Figure 7:
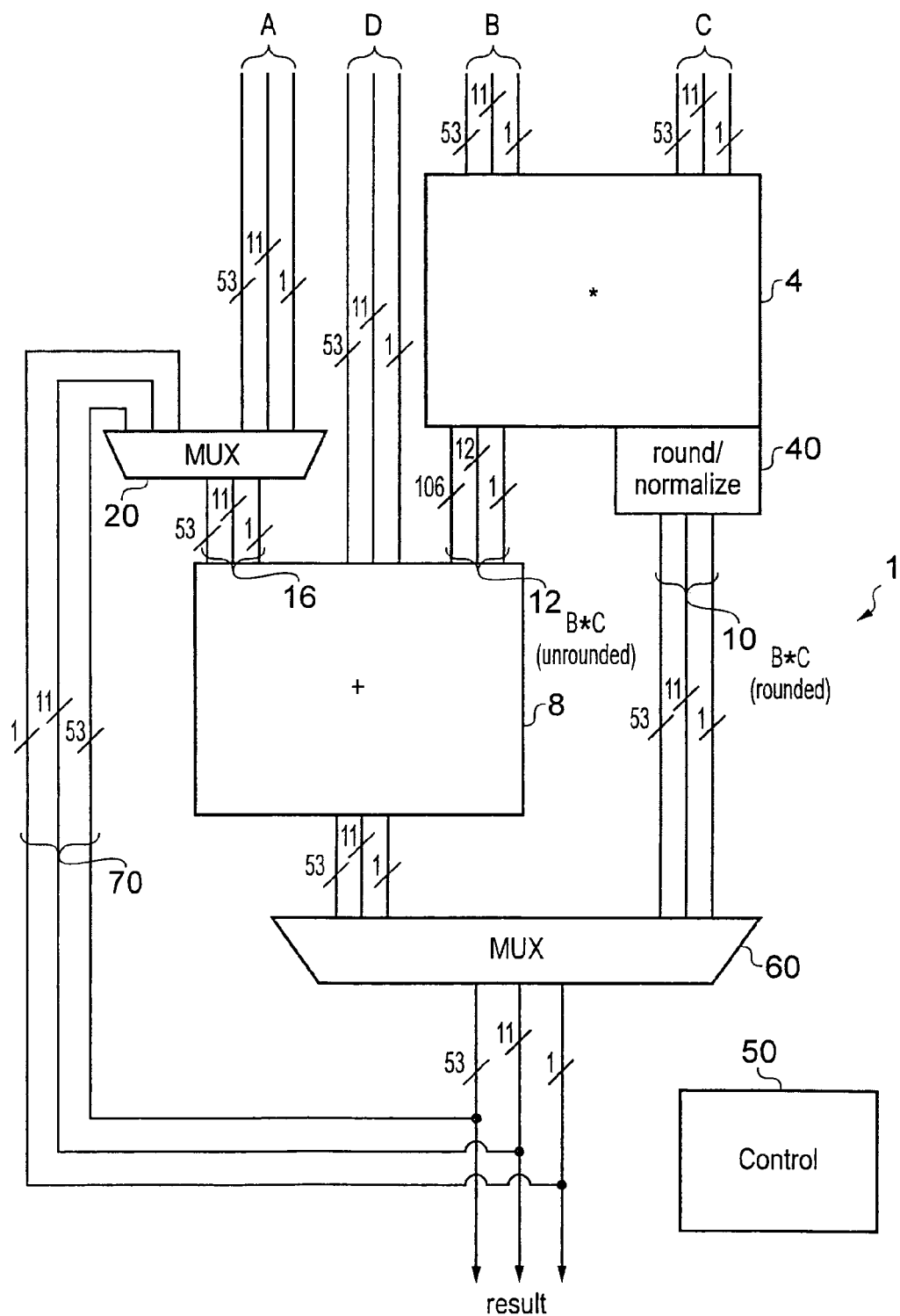
FIG. 7 illustrates further details of the fused multiply add unit.

FIG. 7 shows the fused multiply add unit 1 in more detail. Unlike in FIG. 3, in FIG. 7 the paths for transferring the exponent E and the sign bit S of the various floating point values are shown. Elements of FIG. 7 that are the same as those of FIG. 3 are illustrated using the same reference numerals. The data paths of the floating point unit 1, other than the bus 12 linking the multiply circuitry 4 and the adding circuitry 8, transfer double precision floating point values having a 53-bit significand (including the implied bit), an 11-bit exponent, and a single sign bit. However, the bus 12 transfers the unrounded product B*C from the multiplying circuitry 4 to the adding circuitry 8 and so transfers a 106-bit significand, a 12-bit exponent and a single sign bit (the 106-bit significand arises from multiplication of two 53-bit significands and the 12-bit exponent arises from addition of two 11-bit exponents). By providing the wider interface 12 between the multiply and add stages, an additional rounding operation is avoided and so a higher precision value is forwarded to the adding stage. The adding circuitry 8 therefore produces a more accurate output than if a narrower interface was used to link the multiplying circuitry 4 and adding circuitry 8.

As noted above, the multiply circuitry 4 can be used both to perform a multiply operation as part of a fused multiply add instruction and to perform a multiply operation in response to a stand alone multiply instruction. Therefore, the multiply circuitry includes two outputs: an output 12 used to transfer the unrounded product B*C to the adding circuitry 8 in response to the multiply add instruction, and an output 10 used to transfer a rounded product B*C for output as a result of the multiply instruction. To produce the rounded product the multiply circuitry 4 uses rounding circuitry 40 which performs a rounding operation on the products by inserting a rounding value during the multiplication. The rounding circuitry also performs normalization on the product so as to generate a result value in the double precision format. Although it is not illustrated in FIG. 7, the adding circuitry 8 also includes circuitry for performing rounding and normalization.

The floating point fused multiply add unit 1 includes control circuitry 50 for controlling the elements of the floating point multiply add unit 1 in response to the fused multiply add instruction, the add instruction or the multiply instruction. The multiply add unit 1 includes various connecting lines linking the control circuitry 50 with the multiply circuitry 4, the adding circuitry 8, and the multiplexers 20 and 60, although these lines have not been illustrated for clarity. The control unit 50 can control the multiply add unit 1 to forward the results of one instruction along bus 70 to multiplexer 20 where the result can be fed into the adding circuitry 8 to be used as operand A for a subsequent instruction. The control circuitry 50 controls the multiplying circuitry 4 and the adding circuitry 8 so that the operand A is input to the adding circuitry 8 after the multiplying circuitry 4 has generated the unrounded product B*C.

Figure 8:
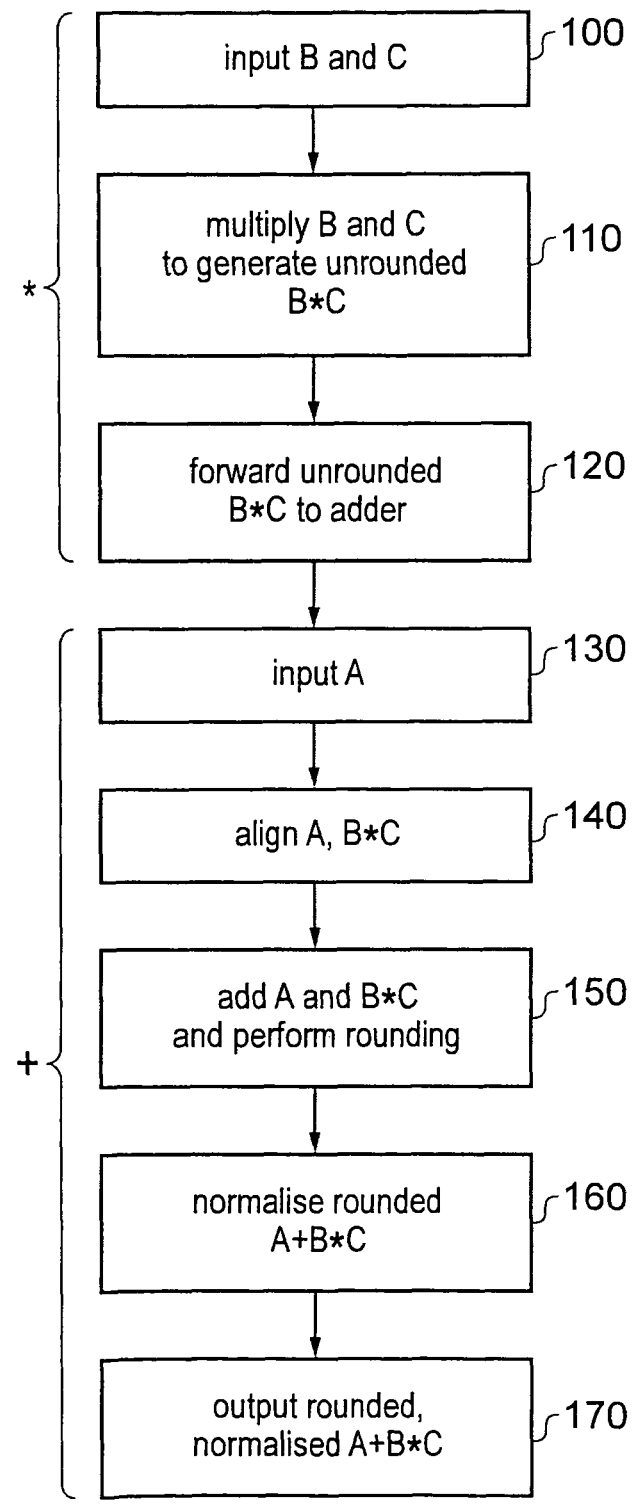
FIG. 8 illustrates a process for executing a fused multiply add instruction.

FIG. 8 shows a method for executing a fused multiply add instruction using the fused multiply add unit 1. At step 100, the operands B and C are input to the multiplying circuitry 4. Then, at step 110 the multiply circuitry 4 multiplies operands B and C. This is done by multiplying the significand of operand B and C to generate a significand with twice as many bits as the significands of operands B and C, and adding the exponents of operands B and C to generate an exponent having one more bit than the exponents of operands B and C. The sign bit of operands B and C are multiplied to obtain the sign bit of the product B*C. Thus, an unrounded product B*C having a 106-bit significand is generated by the multiply circuitry 4. Next, at step 120 the unrounded product B*C is forwarded along bus 12 to the adding circuitry 8.

At step 130 (which is performed after the unrounded product B*C is generated in step 110), the operand A is input to the adding circuitry 8. The adding circuitry 8 then commences processing of the operand A and the unrounded product B*C. At step 140, a shifting operation is performed on at least one of the operand A and the unrounded product B*C so as to align their significands. Next, the aligned significands are added together and rounding is performed at step 150 to generate a rounded result A+B*C. At step 160, the adding circuitry 8 normalizes the rounded result A+B*C so as to ensure that the result value is in the form $(-1)^S * 1.F * 2^{E-1023}$. The rounded, normalized result A+B*C is then output by the adding circuitry 8 at step 170.

An examination of the inputs is done in step 130 and for any pair of inputs only one of steps 140 and 160 are necessary (thus the adds are one cycle faster than may otherwise appear from FIG. 8).

Figure 9:
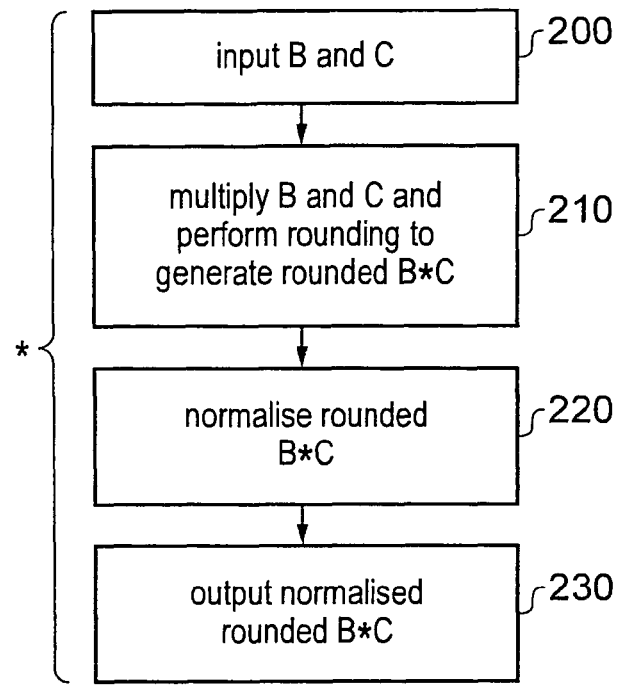
FIG. 9 illustrates a process for executing a multiply instruction.

FIG. 9 illustrates a process for executing a multiply instruction using the fused multiply add unit 1. Since the multiply and add stages are independent from one another the multiply instruction can be executed without using the adding circuitry 8. This means that unlike in the fused multiply add unit of FIG. 2, an unnecessary addition of zero to the product B*C is avoided. First, at step 200, the operands B and C are input to the multiplying circuitry 4. Next, at step 210, the multiplying circuitry multiplies the operands B and C as described above for step 110 of FIG. 8. However, unlike at step 110, at step 210 the multiplying circuitry also performs rounding on the product B*C to generate a rounded product B*C. Rounding is done by inserting a rounding value during multiplication using the rounding circuitry 40. At step 220, the rounding circuitry 40 also normalizes the rounded product B*C so as to produce a normalized, rounded, result in the appropriate floating point format. At step 230, the normalized, rounded, product B*C is then output over bus 10 as a processing result of the multiply instruction.

Figure 10:
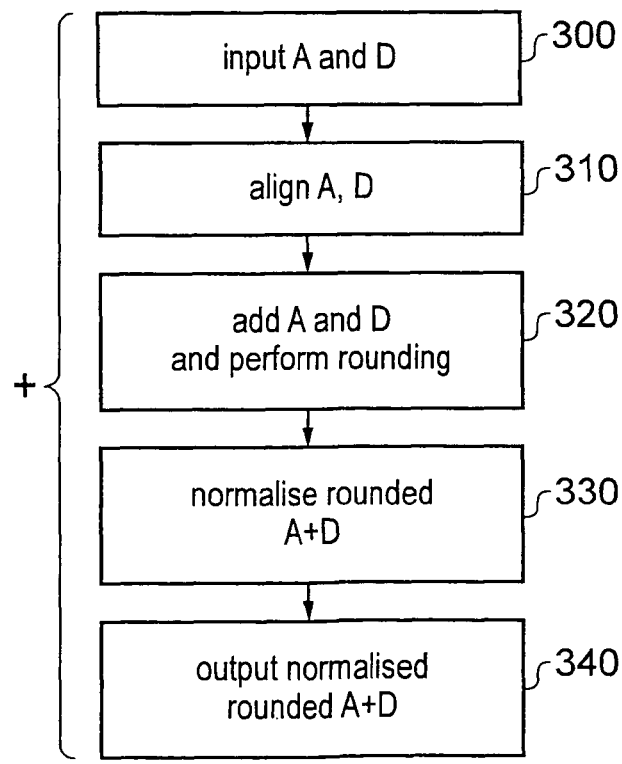
FIG. 10 illustrates a process for executing an add instruction.

FIG. 10 illustrates a process for executing an add instruction using the fused multiply add unit 1. At step 300, the operands A and D are input to the adding circuitry 8. At step 310, the adding circuitry performs shifting on at least one of the operands A and D in order to align their significands. At step 320, the adding circuitry adds operands A and D and performs rounding by inserting a rounding value. The rounded sum A+D is then normalized at step 330 and output at step 340.

In FIGS. 8, 9 and 10, the steps marked with an asterisk * are performed by the multiply circuitry 4 and the steps marked with a plus + are performed by the adding circuitry 8. The control circuitry 50 can control the multiply control circuitry 4 to perform steps 100 to 120 in response to a fused multiply add instruction or to perform steps 200 to 230 in response to a multiply instruction. In parallel with this, the control circuitry 50 can control the adding circuitry 8 to perform steps 130 to 170 in response to a fused multiply add instruction or steps 300 to 340 in response to an add instruction. Thus, processing of the three types of instructions can be interleaved with one another in order to reduce the number of cycles required to process a sequence of instructions.

The multiply circuitry 4 acts as a multiply pipeline having several pipeline stages, each of the multiply pipeline stages taking one processing cycle to perform its pipeline operation. Therefore, when, for example, three multiply instructions are to be executed, the multiply circuitry can execute the first pipeline stage m1 of the first multiply instruction in a first processing cycle; execute the second multiply pipeline stage m2 of the first multiply instruction and the first multiply pipeline stage m1 of a second multiply instruction in a second processing cycle; execute a third processing pipeline stage m3 of the first multiply instruction, a second multiply pipeline stage m2 of the second multiply instruction and a third multiply pipeline stage m3 of the third multiply instruction in a third processing cycle, and so on. At any one time, several multiply or multiply add instructions can be being processed by different stages of the multiply circuitry 4. Similarly, the adding circuitry 8 is also a processing pipeline for performing an add operation and can process several add instructions or multiply add instructions in parallel using respective add pipeline stages (see FIGS. 5 and 6).

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A data processing apparatus for performing a fused multiply add operation on operands A, B and C to generate a result A+B*C, said operands A, B and C and said result A+B*C being floating point values each having an N-bit significand, said data processing apparatus comprising:
multiplying circuitry configured to multiply said operand B and said operand C to generate an unrounded product B*C having an M-bit significand, where M>N;
adding circuitry configured to add said unrounded product B*C to said operand A and output a rounded result A+B*C having an N-bit significand; and
control circuitry responsive to a fused multiply add instruction to control said multiplying circuitry and said adding circuitry to perform said fused multiply add operation in a plurality of processing cycles; wherein
said adding circuitry comprises a first input for receiving, from a register or as a result of a preceding instruction, said operand A at a later processing cycle than a processing cycle at which said operands B and C are input to said multiplying circuitry; and
said adding circuitry is controlled by said control circuitry to commence processing of said operand A after said multiplying circuitry has generated said unrounded product B*C,
wherein said data processing apparatus is configured to obtain said operand A from the register or the result of the preceding instruction in a later processing cycle than the processing cycle in which said operands B and C are input to said multiplying circuitry,
said control circuitry is responsive to a multiply instruction to control said multiplying circuitry to multiply said operands B and C; and
said data apparatus is configured to execute said multiply instruction in fewer processing cycles than said fused multiply add instruction.

2. An apparatus according to claim 1, wherein said fused multiply add instruction is one of a sequence of instructions and said operand A is a value generated in response to a preceding instruction in said sequence of instructions.

3. An apparatus according to claim 1, wherein said control circuitry is responsive to a sequence of fused multiply add instructions comprising a first fused multiply add instruction and a second fused multiply add instruction to control said multiplying circuitry and said adding circuitry such that said adding circuitry performs an add operation in response to said first fused multiply add instruction in parallel with said multiply circuitry performing a multiply operation in response to said second fused multiply add instruction.

4. An apparatus according to claim 1, wherein said adding circuitry comprises a second input for receiving an operand D having an N-bit significand; and
said control circuitry is responsive to an add instruction to control said adding circuitry to add said operand A to said operand D and output a rounded result A+D having an N-bit significand.

5. An apparatus according to claim 4, wherein said control circuitry is configured to control said adding circuitry and said multiplying circuitry such that said adding circuitry performs an add operation in response to said add instruction in parallel with said multiplying circuitry performing a multiply operation in response to said fused multiply add instruction.

6. An apparatus according to claim 1, wherein said multiplying circuitry comprises rounding circuitry configured to round said unrounded product B*C having an M-bit significand and output a rounded product B*C having an N-bit significand; and
said control circuitry is responsive to said multiply instruction to control said multiplying circuitry to multiply said operands B and C to generate said unrounded product B*C and to control said rounding circuitry to output said rounded product B*C.

7. An apparatus according to claim 6, wherein said control circuitry is configured to control said adding circuitry and said multiplying circuitry such that said adding circuitry performs an add operation in response to said fused multiply add instruction in parallel with said multiplying circuitry performing a multiply operation in response to said multiply instruction.

8. An apparatus according to claim 6, wherein said multiplying circuitry comprises a first output for transferring said unrounded product B*C to said adding circuitry in response to said fused multiply add instruction and a second output for outputting said rounded product B*C as a processing result of said multiply instruction.

9. An apparatus according to claim 1, further comprising unrounded product forwarding circuitry having an M-bit data path for transferring said unrounded product B*C from said multiplying circuitry to said adding circuitry.

10. An apparatus according to claim 1, wherein said operands A, B and C and said rounded result A+B*C have an X-bit exponent, and said unrounded product B*C has an X+1-bit exponent, X being an integer; and said apparatus comprises exponent forwarding circuitry having an X+1-bit data path for transferring said X+1-bit exponent of said unrounded product B*C from said multiplying circuitry to said adding circuitry.

11. An apparatus according to claim 1, wherein N=24 and M=48.

12. An apparatus according to claim 1, wherein N=53 and M=106.

13. An apparatus according to claim 1, wherein the adding circuitry is configured to perform alignment processing for aligning the operand A with the unrounded product B*C, wherein the adding circuitry is configured to begin the alignment processing after the unrounded product B*C has been generated by the multiplying circuitry.

14. A data processing apparatus for performing a fused multiply add operation on operands A, B and C to generate a result A+B*C, said operands A, B and C and said result A+B*C being floating point values each having an N-bit significand, said data processing apparatus comprising:

means for multiplying said operand B and said operand C to generate an unrounded product B*C having an M-bit significand, where M>N;

means for adding said unrounded product B*C to said operand A and output a rounded result A+B*C having an N-bit significand; and means for controlling, in response to a fused multiply add instruction, said means for multiplying and said means for adding to perform said fused multiply add operation in a plurality of processing cycles; wherein said means for adding comprises first input means for receiving, from a register or as a result of a preceding instruction, said operand A at a later processing cycle than a processing cycle at which said operands B and C are input to said means for multiplying; and said means for adding is controllable by said means for controlling to commence processing of said operand A after said means for multiplying has generated said unrounded product B*C, wherein said data processing apparatus is configured to obtain said operand A from the register or the result of the preceding instruction in a later processing cycle than the processing cycle in which said operands B and C are input to said multiplying means:

said means for controlling is for controlling, in response to a multiply instruction, said means for multiplying to multiply said operands B and C; and said data processing apparatus is configured to execute said multiply instruction in fewer processing cycles than said fused multiply add instruction.

15. A method for performing a fused multiply add operation on operands A, B and C to generate a result A+B*C using a data processing apparatus, said operands A, B and C and said result A+B*C being floating point values each having an N-bit significand, said method comprising:

in response to execution of fused multiply add instruction, performing said fused multiply add operation comprising:

multiplying said operand B and said operand C to generate an unrounded product B*C having an M-bit significand, where M>N; and adding said unrounded product B*C to said operand A; and outputting a rounded result A+B*C having an N-bit significand; wherein:

said fused multiply add operation is performed in a plurality of processing cycles;

said adding step receives, from a register or as a result of a preceding instruction, said operand A at a later processing cycle than a processing cycle at which said operands B and C are input to said multiplying step; and said adding step commences processing of said operand A after said multiplying step has generated said unrounded product B*C, wherein said data processing apparatus obtains said operand A from the register or the result of the preceding instruction in a later processing cycle than the processing cycle in which said operands B and C are input to said multiplying circuitry;

wherein said data processing apparatus multiplies said operands B and C in response to execution of a multiply instruction; and wherein said data processing apparatus executes said multiply instruction in fewer processing cycles than said fused multiply add instruction.

* * * * *